United States Patent
Yu et al.

(10) Patent No.: US 10,462,066 B2
(45) Date of Patent: Oct. 29, 2019

(54) APPARATUS AND METHOD FOR REORDERING DATA RADIO BEARER PACKETS

(71) Applicant: QUALCOMM Incorporated, San Diego, CA (US)

(72) Inventors: Yu-Ting Yu, Union City, CA (US); Gavin Bernard Horn, La Jolla, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/588,397

(22) Filed: May 5, 2017

(65) Prior Publication Data

US 2018/0063014 A1 Mar. 1, 2018

Related U.S. Application Data

(60) Provisional application No. 62/382,596, filed on Sep. 1, 2016.

(51) Int. Cl.
| | |
|---|---|
| H04L 12/863 | (2013.01) |
| H04W 28/02 | (2009.01) |
| H04W 28/06 | (2009.01) |
| H04W 28/12 | (2009.01) |
| H04L 12/801 | (2013.01) |
| H04L 29/06 | (2006.01) |
| H04L 12/851 | (2013.01) |

(52) U.S. Cl.
CPC ............ *H04L 47/624* (2013.01); *H04L 47/34* (2013.01); *H04L 47/6205* (2013.01); *H04L 69/22* (2013.01); *H04W 28/0252* (2013.01); *H04W 28/06* (2013.01); *H04W 28/12* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 7,010,607 | B1 * | 3/2006 | Bunton | H04L 1/18 709/228 |
| 2007/0091810 | A1 * | 4/2007 | Kim | H04L 1/1635 370/236 |
| 2009/0318127 | A1 * | 12/2009 | Yi | H04L 1/1829 455/422.1 |
| 2011/0286461 | A1 | 11/2011 | Ichino et al. | |

(Continued)

FOREIGN PATENT DOCUMENTS

WO WO-2013112084 A1 8/2013

OTHER PUBLICATIONS

International Search Report and Written Opinion—PCT/US2017/049467—ISA/EPO—dated Nov. 10, 2017.

*Primary Examiner* — Candal Elpenord
(74) *Attorney, Agent, or Firm* — Loza & Loza, LLP

(57) ABSTRACT

Aspects of the present disclosure provide various apparatuses and methods of reordering DRB flow packets using an in-band solution to reduce delay due to data packet buffering in head-of-line blocking scenarios across multiple DRB flows. When a packet of a flow is lost or not received, other flows carried in the same DRB can forward later received packets without waiting for the missing packet to be retransmitted and received.

28 Claims, 15 Drawing Sheets

(56) References Cited

U.S. PATENT DOCUMENTS

2014/0219198 A1* 8/2014 Chiu .................... H04W 76/20
            370/329
2015/0146648 A1* 5/2015 Viger ................... H04L 1/1621
            370/329

* cited by examiner

APPARATUS AND METHOD FOR REORDERING DATA RADIO BEARER PACKETS

PRIORITY CLAIM

This application claims priority to and the benefit of provisional patent application No. 62/382,596 filed in the United States Patent and Trademark Office on 1 Sep. 2016, the entire content of which is incorporated herein by reference as if fully set forth below in its entirety and for all applicable purposes.

TECHNICAL FIELD

The technology discussed below generally relates to wireless communication systems, and more particularly, to reordering of data packets of data radio bearer flows.

INTRODUCTION

Some wireless networks, for example, Long Term Evolution (LTE) Layer 2 supports packet reordering per data radio bearer (DRB). A DRB is a virtual or logical channel between two network entities, for example, a user equipment and a base station. The number of logical channels or radio bearers in such a wireless network may be limited due to various reasons such as network resource constraints. In some examples, multiple Internet Protocol (IP) flows may be served or carried in the same DRB. In a head-of-line blocking scenario across multiple IP flows, when a packet from one flow is lost, packets of other flows wait until the missing packet is retransmitted and received. There is a desire in the field to reduce these packet delays to improve user experience.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various apparatuses and methods of reordering DRB flow packets using an in-band solution to reduce delay due to data packet buffering in head-of-line blocking scenarios across multiple DRB flows. When a packet of a flow is lost or not received, other flows carried in the same DRB can forward later received packets without waiting for the missing packet to be retransmitted and received.

One aspect of the present disclosure provides a method of communication operable at a transmitting apparatus. The transmitting apparatus establishes a data radio bearer (DRB) with a receiving device. Then, the transmitting apparatus transmits a plurality of first packets to the receiving device utilizing the DRB. The plurality of first packets include a plurality of packets corresponding to a first flow and a plurality of packets corresponding to a second flow separate from the first flow. Each of the plurality of first packets includes a last packet indicator configured to indicate a previously transmitted packet of a same flow.

Another aspect of the present disclosure provides a method of communication operable at a receiving apparatus. The receiving apparatus establishes a data radio bearer (DRB) with a transmitting device. Then, the receiving apparatus receives a plurality of first packets from the transmitting device utilizing the DRB. The plurality of first packets includes a plurality of packets corresponding to a first flow and a plurality of packets corresponding to a second flow separate from the first flow. Each of the plurality of first packets includes a last packet indicator configured to indicate a packet of a same flow previously transmitted by the transmitting device. The receiving apparatus further determines whether to buffer one or more of the plurality of first packets for out-of-order delivery before forwarding the first packets to an upper protocol layer based on the last packet indicators of the first packets.

Another aspect of the present disclosure provides an apparatus for wireless communication. The apparatus includes a communication interface configured to communicate with a receiving device, a memory stored with executable code, and a processor operatively coupled to the communication interface and memory. The processor is configured by the executable code to establish a data radio bearer (DRB) with the receiving device and transmit a plurality of first packets to the receiving device utilizing the DRB. The plurality of first packets include a plurality of packets corresponding to a first flow and a plurality of packets corresponding to a second flow separate from the first flow. Each of the plurality of first packets includes a last packet indicator configured to indicate a previously transmitted packet of a same flow.

Another aspect of the present disclosure provides an apparatus for wireless communication. The apparatus includes a communication interface configured to communicate with a transmitting device, a memory stored with executable code, and a processor operatively coupled to the communication interface and memory. The processor is configured by the executable code to establish a data radio bearer (DRB) with the transmitting device and receive a plurality of first packets from the transmitting device utilizing the DRB. The plurality of first packets include a plurality of packets corresponding to a first flow and a plurality of packets corresponding to a second flow separate from the first flow. Each of the plurality of first packets includes a last packet indicator configured to indicate a packet of a same flow previously transmitted by the transmitting device. The processor is further configured to determine whether to buffer one or more of the plurality of first packets for out-of-order delivery before forwarding the first packets to an upper protocol layer based on the last packet indicators of the first packets.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a wireless communication network, a user equipment (UE) can communicate with a network or base station via one or more radio bearers. A radio bearer (RB) is a logical channel that may be established between the UE and a network entity (e.g., eNodeB, eNB, base station, and the like). In some networks, for example, a Long Term Evolution (LTE) network, radio bearers are logical channels offered at the Layer 2 or higher protocol layers for the transfer of user and/or control data. Two examples of radio bearers are data radio bearer (DRB) and signaling radio bearer (SRB). An SRB may be used to carry control plane traffic. For example, the SRB may be used to carry Radio Resource Control (RRC) signaling messages. A DRB may be used to carry user plane traffic such as user data or payload. In some examples, a single DRB may carry multiple IP flows, for example, transport control protocol (TCP) flows, user datagram protocol (UDP) flows, voice over Internet protocol (VoIP) flows, etc., in any combinations.

Aspects of the present disclosure provide various apparatuses and methods of reordering DRB flow packets using an in-band solution to reduce delay due to data packet buffering in head-of-line blocking scenarios across multiple DRB flows. In some examples, when a packet of a certain flow is lost or not received, other flows carried in the same DRB may forward their later received packets without waiting for the missing packet to be retransmitted and received. Accordingly, the disclosed methods can reduce the buffering burden of a receiver and long packet delays due to head-of-line blocking of packets.

Figure 1:
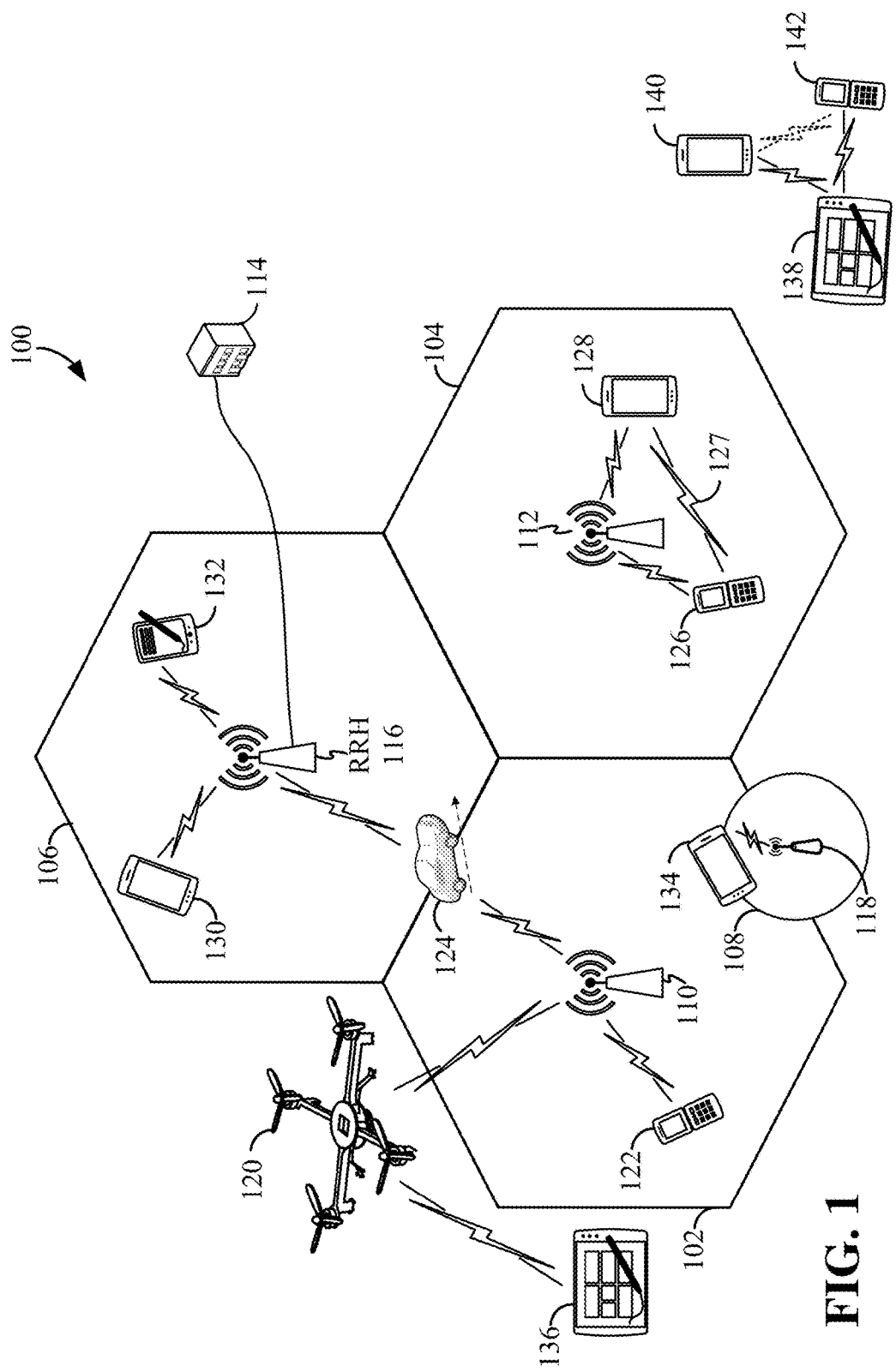
FIG. 1 is a conceptual diagram illustrating an example of a radio access network.

While some examples described herein may refer to certain aspects of an LTE network, the various concepts presented throughout this disclosure may be implemented across a broad variety of telecommunication systems, network architectures, and communication standards, including but not limited to the LTE example and next generation networks (e.g., 5G). Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. The communication between the UE and the base station may include one or more flows carried in a data radio bearer (DRB) and/or a signaling radio bearer (SRB). Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 μs, 500 μs, 1 ms, etc.).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
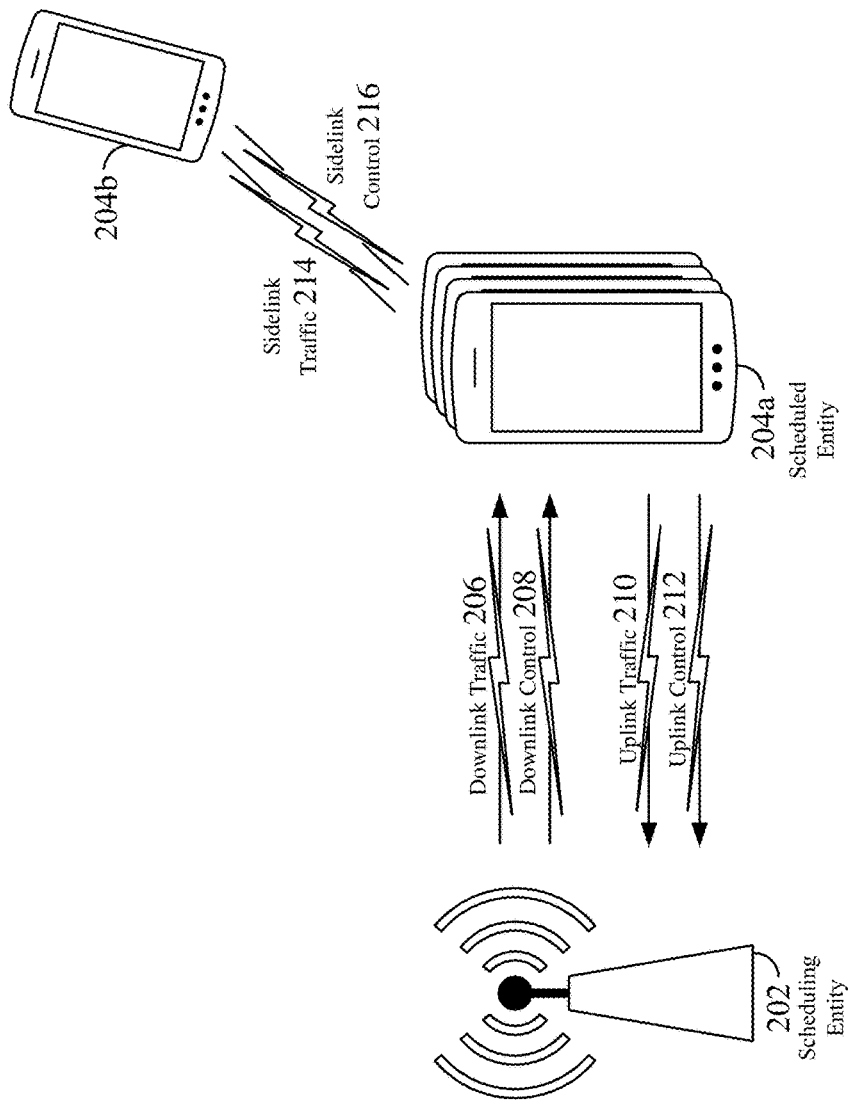
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

In some aspects of the disclosure, the channels shown in FIG. 2 may be carried by data radio bearers and/or signaling radio bearers established between the transmitting device and the receiving device. The channels or carriers illustrated in FIG. 2 are not necessarily all of the channels or carriers that may be utilized by a scheduling entity 202 and scheduled entities 204, and those of ordinary skill in the art will recognize that other channels or carriers may be utilized in addition to those illustrated, such as other traffic, control, and feedback channels.

Figure 3:
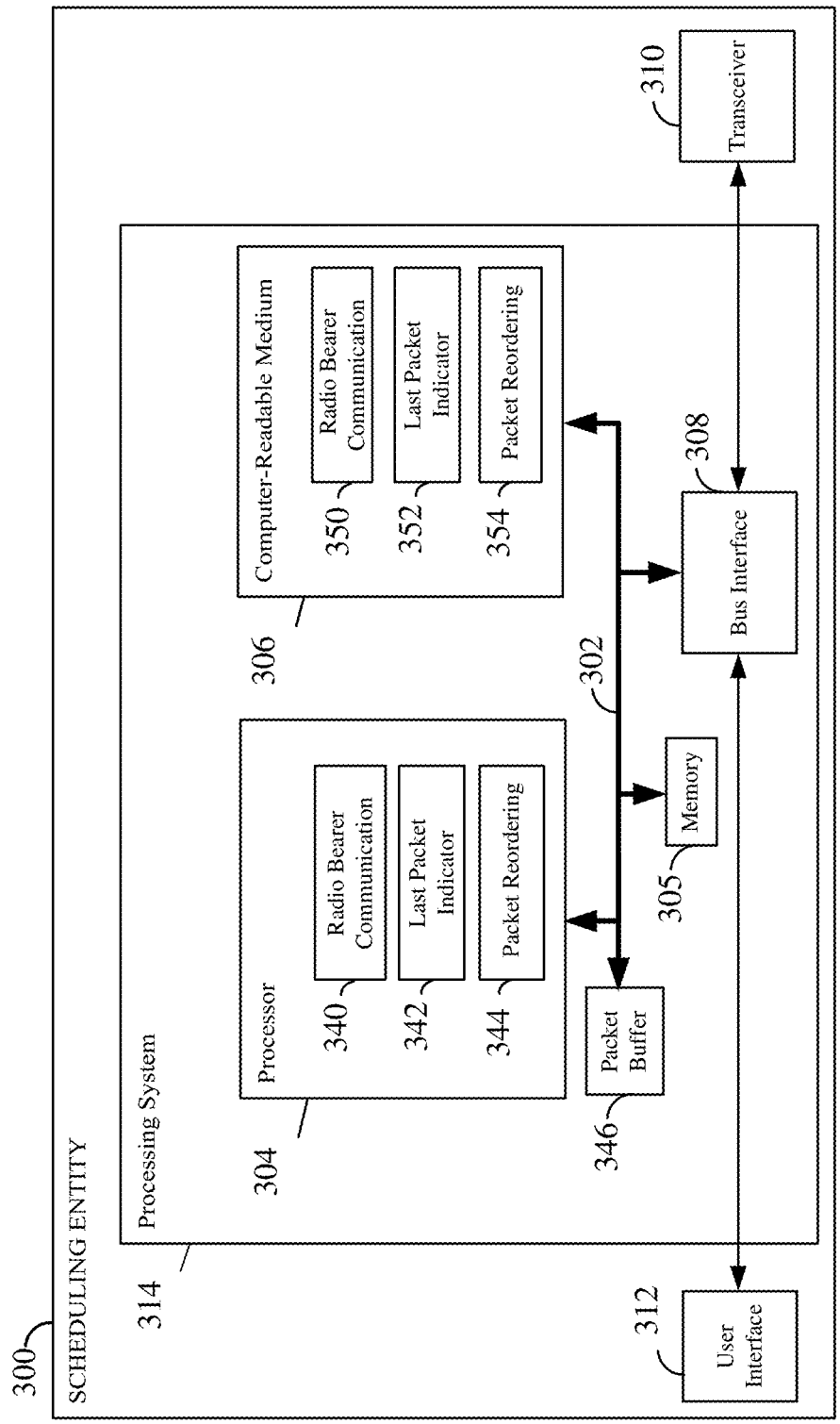
FIG. 3 is a block diagram illustrating an example of a hardware implementation for a scheduling entity employing a processing system according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1, 2, 5, 9, and/or 11. In another example, the scheduling entity 300 may be a base station as illustrated in any one or more of FIGS. 1, 2, 5, 9, and/or 11.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 7-14.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include various circuitry configured to implement one or more of the functions described below in relation to FIGS. 7-14. For example, the processor 304 may include a radio bearer communication block 340, a last packet indicator block 342, and a packet reordering block 344. The radio bearer communication block 340 may be configured to perform various functions for establishing, configuring, and/or maintaining one or more data radio bearers and/or signaling radio bearers for data communication as described below. The last packet indicator block 342 may be configured to perform various functions for determining a value of a last packet indicator included in a packet as described below. The packet reordering block 344 may be configured to perform various functions for reordering packets of DRB flows in certain head-of-line blocking scenarios. The processing system 314 may include a packet buffer 346 configured to store, buffer, and reorder packets of DRB flows. In some examples, the packet buffer 346 may be included in the memory 305.

The processor 304 is responsible for managing the bus 302 and general processing, including the execution of software stored on the computer-readable medium 306. The software, when executed by the processor 304, causes the processing system 314 to perform the various functions described below in FIGS. 7-14 for any particular apparatus. The computer-readable medium 306 and the memory 305 may also be used for storing data that is manipulated by the processor 304 when executing software. For example, the computer-readable medium 306 and/or the memory 305 may be used to store a last sequence number (SN) of packets sent within a flow. The computer-readable medium 306, memory 305, and/or packet buffer 346 may be used to buffer packets received from one or more flows.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software configured to implement one or more of the functions described in relation to FIGS. 7-14. The computer-readable storage medium 306 may include radio bearer communication code 350, last packet indicator code 352, and packet reordering code 354. The radio bearer communication code 350 may configure the processing system 314 to perform various functions for establishing, configuring, and/or maintaining one or more data radio bearers and/or signaling radio bearers for data communication as described below. The last packet indicator code 352 may configure the processing system 314 to perform various functions for determining a value of a last packet indicator included in a packet as described below. The packet reordering code 354 may configure the processing system 314 to perform various functions for reordering packets of DRB flows in certain head-of-line blocking scenarios as described below.

Figure 4:
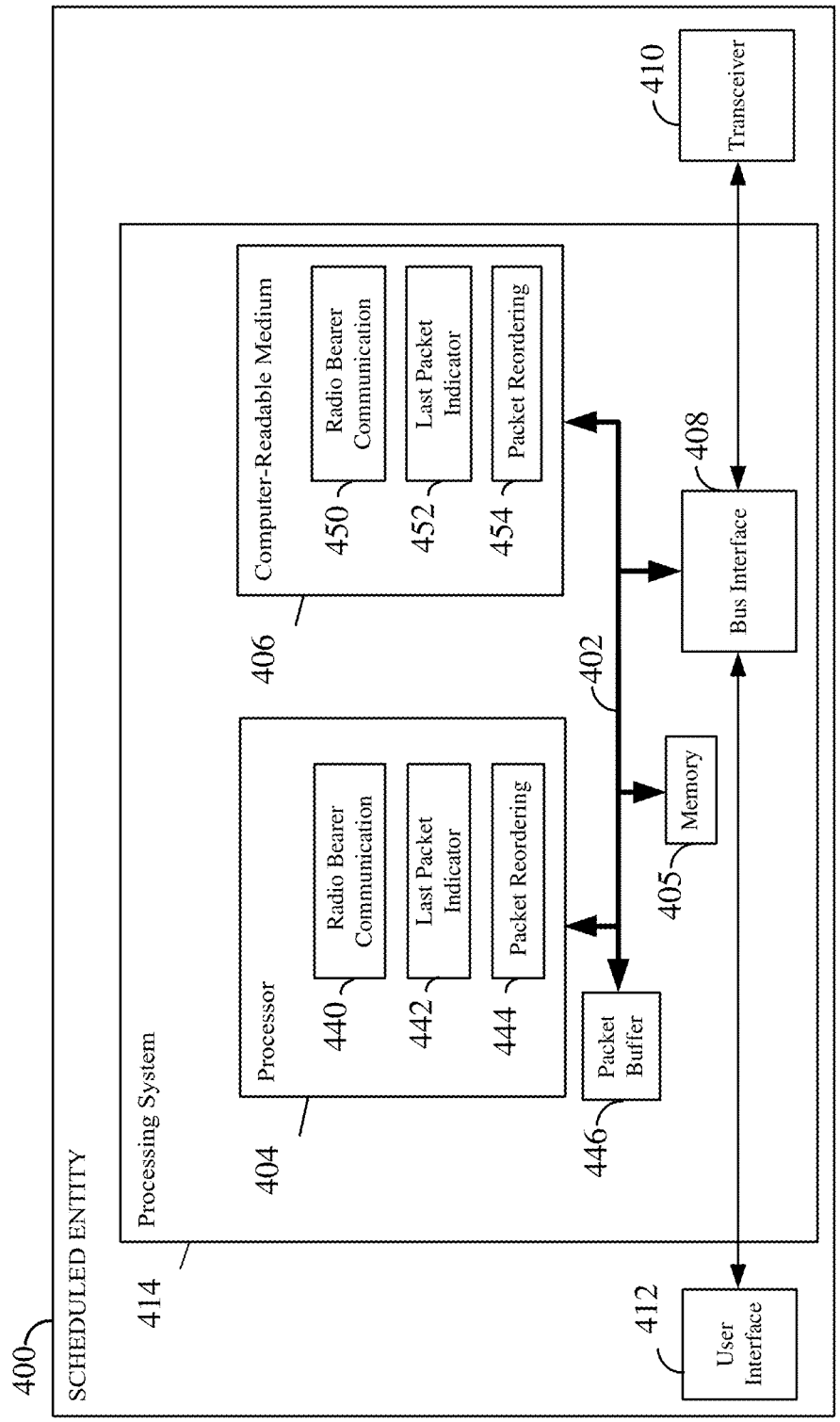
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, 5, 9, and/or 11.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below and illustrated in FIGS. 7-14.

In some aspects of the disclosure, the processor 404 may include a radio bearer communication block 440, a last packet indicator block 442, and a packet reordering block 444. The radio bearer communication block 440 may be configured to perform various functions for establishing, configuring, and/or maintaining one or more data radio bearers and/or signaling radio bearers for data communication as described below. The last packet indicator block 442 may be configured to perform various functions for determining a value of a last packet indicator included in a packet as described below. The packet reordering block 444 may be configured to perform various functions for reordering packets of DRB flows in certain head-of-line blocking scenarios. The processing system 414 may include a packet buffer 446 configured to store, buffer, and reorder packets of DRB flows. In some examples, the packet buffer 446 may be included in the memory 405. In some examples, the computer-readable medium 406 and/or the memory 405 may be used to store a last sequence number (SN) of packets sent using one or more flows (e.g., DRB flows). The computer-readable medium 406, the memory 405, and/or the packet buffer 446 may be used to buffer packets received from one or more flows.

In one or more examples, the computer-readable storage medium 406 may include software configured to implement one or more of the functions described in relation to FIGS. 7-14. The computer-readable storage medium 406 may include radio bearer communication code 450, last packet indicator code 452, and packet reordering code 454. The radio bearer communication code 450 may configure the processing system 414 to perform various functions for establishing, configuring, and/or maintaining one or more data radio bearers and/or signaling radio bearers for data communication as described below. The last packet indicator code 452 may configure the processing system 414 to perform various functions for determining a value of a last packet indicator included in a packet as described below. The packet reordering code 454 may configure the processing system 414 to perform various functions for reordering packets of DRB flows in certain head-of-line blocking scenarios as described below.

Figure 5:
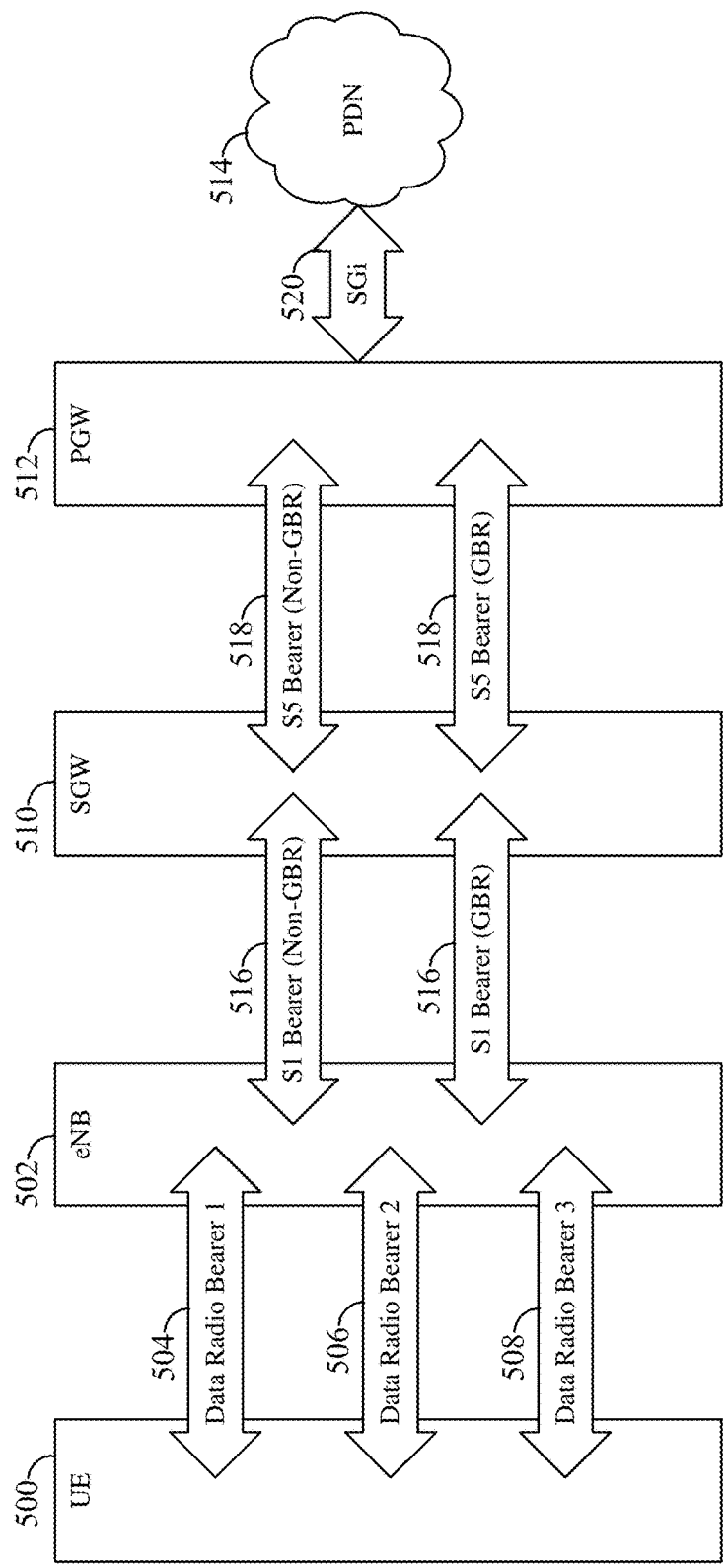
FIGS. 5 and 6 are diagrams illustrating some examples of radio bearers established in a communication network according to some aspects of the disclosure.

FIG. 5 is a diagram illustrating some examples of radio bearers established in a communication network in accordance with some aspects of the disclosure. A radio bearer defines how data is handled when it travels across the network. Some flows of data may be provided with a guaranteed bit rate (GBR) while other flows may not (e.g., non-GBR flows). In general, a radio bearer refers to a set of network parameters that define how data is treated or handled by the network.

Figure 6:
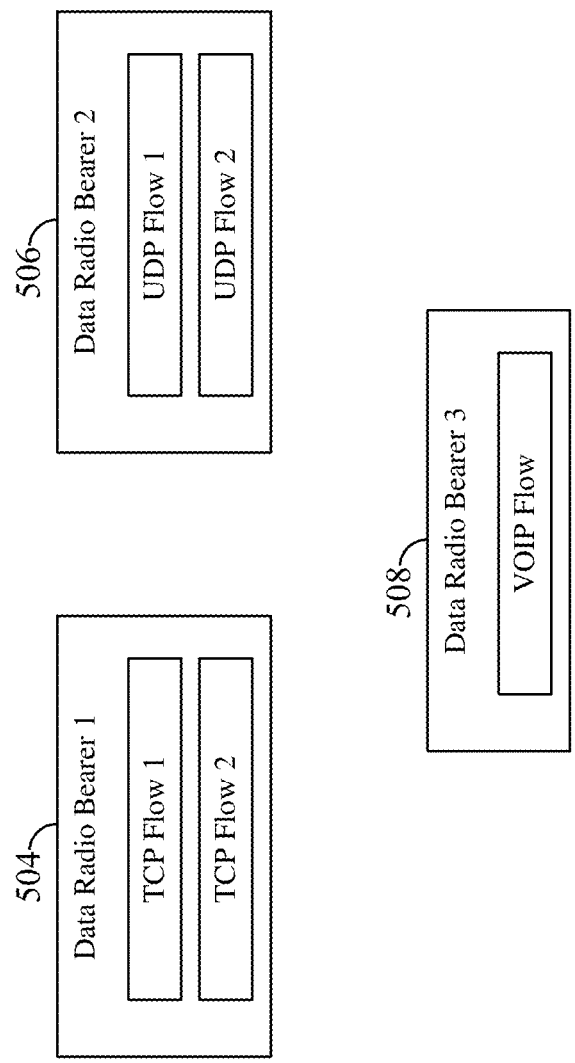

Three exemplary DRBs are shown in FIG. 5 between a UE 500 and an eNB 502. The UE 500 may be any of the UEs shown in FIGS. 1, 2, 4, 9, and/or 11, and the eNB 502 may be any of the scheduling entity shown in FIGS. 1, 2, 3, 9, and/or 11. In one example, a first DRB 504 may be an acknowledged mode (AM) non-guaranteed bit rate (non-GBR) DRB, and a second DRB 506 may be an unacknowledged mode (UM) DRB. A third DRB 508 may be an AM mode GBR DRB. In this example, the first DRB 504 may carry more than one IP flow (e.g., TCP flow 1 and TCP flow 2 of FIG. 6). The second DRB 506 may carry more than one IP flow (e.g., UDP flow 1 and UDP flow 2 of FIG. 6). The third DRB 508 may carry a Voice over IP (VoIP) flow (see FIG. 6). In other examples, the UE 500 may have other combinations of DRBs established with the network (e.g., eNB 502).

FIG. 5 further schematically illustrates the links between various nodes in the network, for example, a serving gateway (SGW) 510, a packet data network gateway (PGW) 512, and a packet data network (PDN) 514. Specifically, FIG. 5 illustrates communication links (e.g., DRBs) between the UE 500 and eNB 502; communication links (e.g., S1 bearers 516) between the eNB 502 and SGW 510; communication links (e.g., S5 bearers 518) between the SGW 510 and PGW 512; and communication links (e.g., SGi bearers 520) between the PGW 512 and PDN 514.

Figure 7:
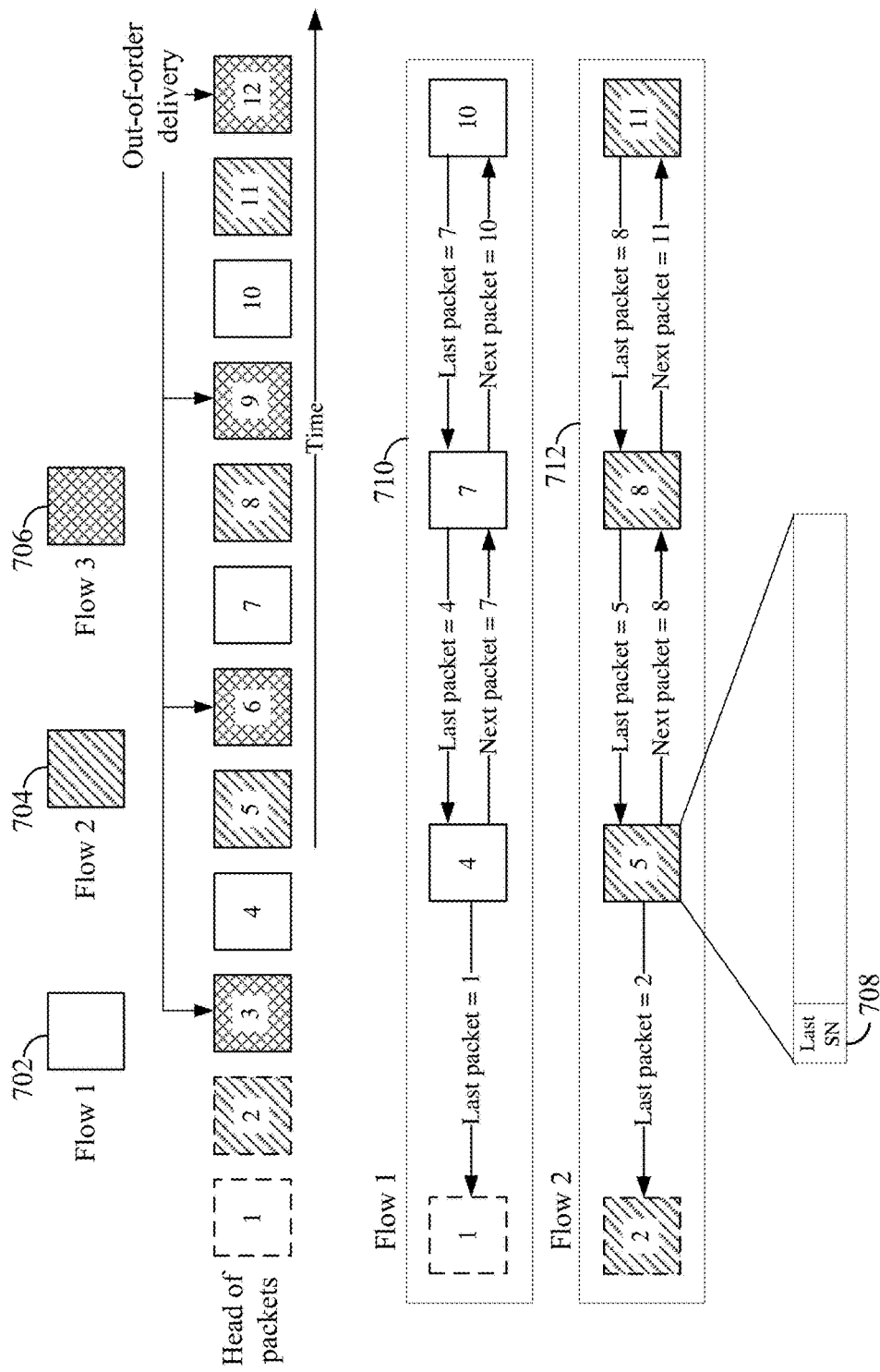
FIG. 7 is a diagram illustrating exemplary data packets of three different flows carried in a same data radio bearer (DRB) according to some aspects of the disclosure.

FIG. 7 is a diagram illustrating exemplary data packets of three IP flows carried in a same DRB in accordance with some aspects of the disclosure. The packets may be carried in a DRB established between the UE 500 and eNB 502 of FIG. 5 or any DRB. These flows (e.g., flow 1, flow 2, and flow 3) may be used to carry various types of data such as TCP flows, UDP flows, and VoIP flows in any combinations. The data packets of the flows may be transmitted in sequence in an interleaved fashion, and each packet is identified by a packet sequence number (e.g., 1, 2, 3, . . . 12 in FIG. 6). In some examples, the packets may be Layer 2 packets such as packet data convergence protocol (PDCP) protocol data units (PDUs). Throughout this disclosure, the terms packet and PDU may be used interchangeably. In this example, packets 1, 4, 7, and 10 belong to a first flow 702 (flow 1); packets 2, 5, 8, and 11 belong to a second flow 704 (flow 2); and packets 3, 6, 9, and 12 belong to a third flow 706 (flow 3). The transmitting device (e.g., UE or eNB) maintains and increments a packet sequence number after a packet is transmitted. After receiving the packets, the receiving device (e.g., UE or eNB) can reassemble and deliver the packets to an upper protocol layer entity (IP layer or Layer 3). For example, once all the packets of the same PDU of the upper protocol layer are received, these packets may be delivered to the upper layer. In some examples, the packets of a same flow may be delivered to the upper layer once a predetermined number of packets have been received. In some examples, the transmitting device may indicate the number of packets included in a PDU in the first packet.

In general, when one or more head-of-line packets (e.g., packet 1 of flow 1 and packet 2 of flow 2) are not received, corrupted, or missing, the receiving device cannot deliver the later received packets (e.g., packets 3, 4, . . . 12) to the upper protocol level. For example, in FIG. 7, assuming the transmitting device (e.g., a UE or eNB) has transmitted packets 1 through 12 via a DRB, but only packets 3 through 12 are successfully received by the receiving device. Packet 1 of flow 1 and packet 2 of flow 2 are lost or not received. In this case, the receiving device may buffer the received packets and wait for the missing packets 1 and 2 to be retransmitted and received. However, waiting for the missing packets of flow 1 and flow 2 will create an unnecessary delay to the packets of flow 3 because all the packets (i.e., packets 3, 6, 9, and 12) of flow 3 are already received and may be immediately forwarded to the upper protocol layer. In other words, flow 3 is blocked by the missing head-of-line packets of the flow 1 and flow 2 in this example.

Aspects of the present disclosure provide for a radio bearer packet reordering method using in-band control to reduce delays in packet delivery due to missing or out-of-sequence packets. The described packet reordering method is not limited to DRB packets and may be used to reorder other types of data packets. The transmitting device may locally maintain in its memory a last sequence number (SN) of packets sent within each flow. That is, the last SN is updated to indicate the SN of the packet last sent for an associated flow. When a next packet is sent, the transmitting device includes a last SN 708 of the same flow in the packet's header. For example, in flow 1, the last SN is 1 when packet 4 is transmitted; and similarly, the last SN is 4 when packet 7 is transmitted. In flow 2, the last SN is 2 when packet 5 is transmitted; and similarly, the last SN is 5 when packet 8 is transmitted.

In some aspects of the disclosure, a packet may use a special value or predetermined value (e.g., last SN=−1) to indicate that either there is no last SN or packet, or the packet does not need to be buffered for reordering. For example, if packet 1 of flow 1 is the first or initial packet of this flow, the last SN of this packet may be set to a special value to indicate that there is no previous packet for flow 1. Similarly, the last SN of packet 2 may be set to a special value to indicate that packet 2 is the first packet of flow 2. When a receiving device receives such a packet with a special last SN, the packet may be processed and forwarded to the upper protocol layer without waiting for any previous packets.

Figure 8:
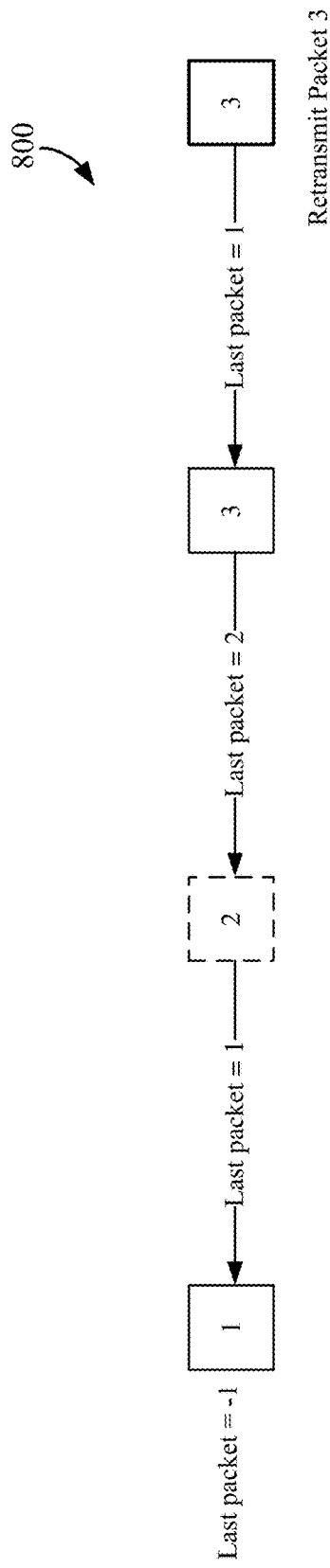
FIG. 8 is a diagram illustrating an exemplary data packets reordering process according to some aspects of the disclosure.

FIG. 8 is a diagram illustrating an exemplary data packets reordering process 800 in accordance with some aspects of the disclosure. A device transmits three packets (packets 1, 2, and 3) to a receiving device. In this example, the packets are transmitted in the order of packet 1, packet 2, and packet 3. The last SN of packet 1 has a special value (e.g., −1) to indicate that it is the first packet of a flow. The last SN of packet 2 is 1, and the last SN of packet 3 is 2. The receiving device receives packet 1 and packet 3, but not packet 2 and/or 3. In some cases, the transmitting device may decide that packet 2 is no longer needed. In one example, the transmitting device may retransmit packet 3 with its last SN set to the value of −1 or any predetermined value such that the receiving device can deliver packet 3 to the upper protocol layer without waiting for packet 2.

In some aspects of the disclosure, the receiving device locally maintains in its memory a two-way SN chain for each flow, for example, SN chain 710 for flow 1 and SN chain 712 for flow 2. The forward direction of the chain indicates the next packet in sequence of each received packet, representing the order of delivery to the upper protocol layer. The reverse direction of the SN chain represents the last packet (previous packet in sequence) a packet needs to wait for before it can be delivered to the upper protocol layer. The last packet becomes available as the packet is received, and the next packet information is added to the SN chain when the next packet is received.

For example, referring the FIG. 7, packets 4, 7, and 10 of flow 1 are waiting for missing packet 1 to be received before these received packets can be delivered to the upper protocol layer. Similarly, packets 5, 8, and 11 of flow 2 are waiting for missing packet 2 to be received before these packets can be delivered to the upper protocol layer. When the missing packets are received, the buffered packets of flow 1 and flow 2 may be forwarded to the upper protocol layer in order according to their respective SN chains.

However, if flow 3 does not have any missing packets, the received packets (e.g., packets 3, 6, 9, and 12) can be delivered or forwarded immediately without further buffering or delay. It is because the packets of flow 3 do not need to wait for the missing packets of flows 1 and 2. In this case, the packets of flow 3 may be forwarded out-of-order because a flow 3 packet (e.g., packet 6) received later than packets (e.g., packets 4 and 5) may be forwarded earlier, different from their received order. Once the missing packet 1 is received, the packets associated with flow 1 can be forwarded in an order based on the next packet pointer of the SN chain. The same applies to flow 2 when the missing packet 2 is received. With this method, the packets of different flows (flows 1, 2, and 3) carried in the same DRB can be reordered and forwarded to the upper protocol layer to reduce unnecessary delay and buffering at the receiving device due to missing packets that may cause head-of-line blocking.

When the receiving device receives a packet with the last SN set to a special value or a predetermined value (e.g., −1) that indicates no last SN or packet, the receiving device may assume that the packet belongs to a new flow and may forward the received packet(s) associated with the same flow immediately without waiting for further packets.

Figure 9:
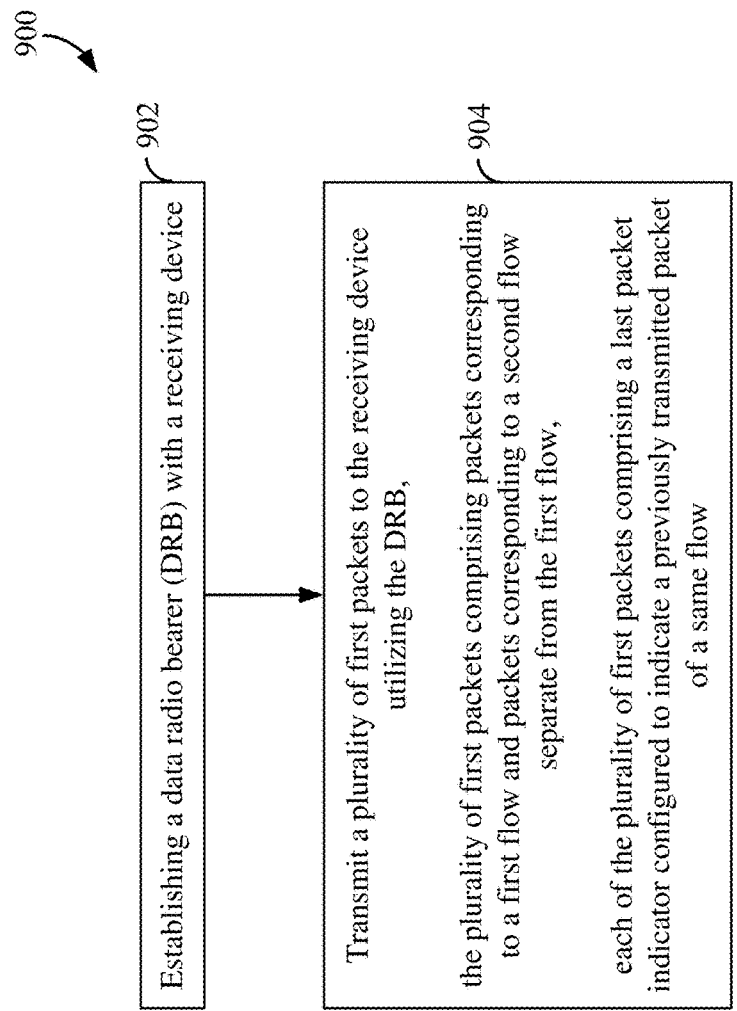
FIG. 9 is a flow chart illustrating a wireless communication method operable at a transmitting apparatus utilizing in-band control for DRB flows according to some aspects of the disclosure.

FIG. 9 is a flow chart illustrating a communication method 900 operable at a transmitting apparatus utilizing in-band control in DRB flows in accordance with some aspects of the disclosure. This method may be performed using any of the scheduling entities and/or scheduled entities illustrated in FIGS. 1-5, 10, and/or 12. At block 902, a transmitting device may utilize a radio bearer communication block 340 or 440 to establish one or more DRBs with a receiving device.

Figure 10:
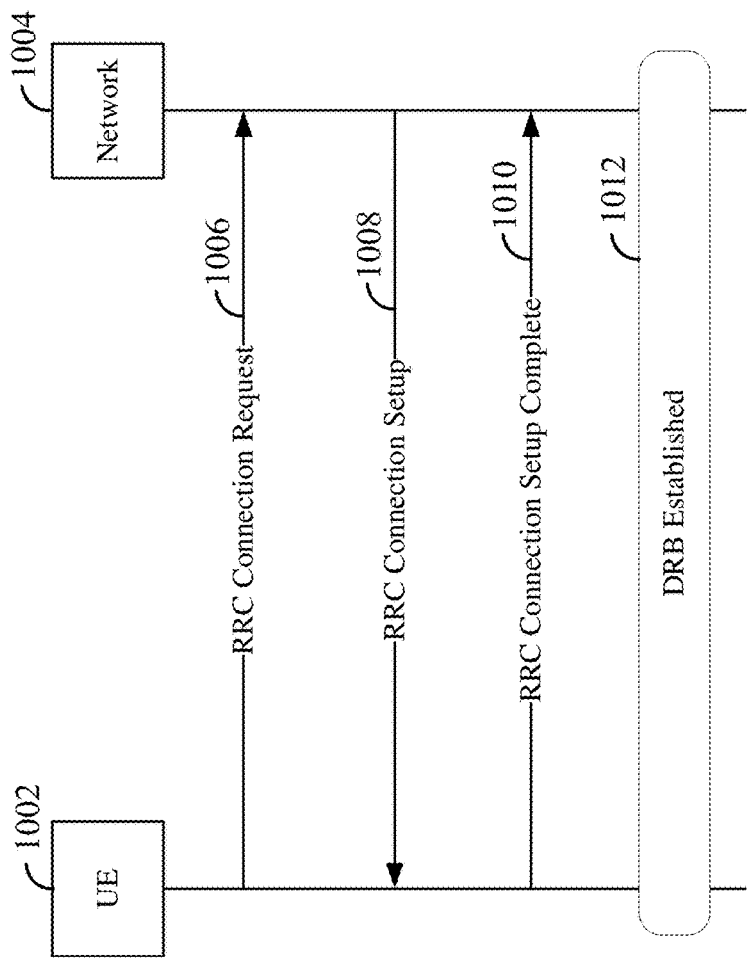
FIG. 10 is a flow diagram illustrating an exemplary process for establishing a DRB according to an aspect of the disclosure.

An exemplary process for establishing a DRB is illustrated in FIG. 10. A UE 1002 may establish a DRB with a network 1004 by transmitting a connection request 1006 (e.g., an RRC Connection Request message) or the like. For example, the RRC Connection Request message may be transmitted on a Common Control Channel (CCCH) using a signaling radio bearer (SRB). If the network 1004 (e.g., eNB) accepts the UE's connection request, the network may respond, e.g., by transmitting an RRC Connection Setup message 1008 to the UE 1002. This message may contain configuration information for establishing various radio bearers and physical channels, CQI Reports, sounding reference signal (SRS), antenna configuration, and/or scheduling requests. In response, the UE 1002 may enter a connected state (e.g., an RRC connected state) and create a UE context. In one example, the RRC Connection Setup message 1008 may include information elements for establishing one or more DRBs with the UE. Then, the UE 1002 may transmit a connection complete message (e.g., an RRC Connection Setup Complete message 1010) to the network. This message contains various information, for example, information for establishing one or more DRBs with the network. The UE 1002 may use a similar procedure to establish more than one DRBs 1012. In other examples, other processes known in the art may be used to establish a DRB with the UE and the network.

Referring back to FIG. 9, at block 904, the transmitting device may utilize a radio bearer communication block 340 or 440 to transmit a plurality of first packets to the receiving device utilizing the DRB. The plurality of first packets include packets corresponding to a first flow and packets corresponding to a second flow separate from the first flow. Each of the first packets includes a last packet indicator configured to indicate a previously transmitted packet of a same flow. The plurality of flows may the same as the flows (e.g., flow 1, flow 2, and flow 3) described in relation to FIG. 7. In some examples, the flows may be TCP flows, UDP flows, VoIP flows, or any combinations. The transmitting device may utilize a last packet indicator block 342 or 442 to format the first packets such that each packet includes a last packet indicator configured to indicate a previously transmitted packet (last packet) of a same flow. For example, the last packet indicator may be contained in the last SN 708 field of a packet described above in relation to FIG. 7.

Figure 11:
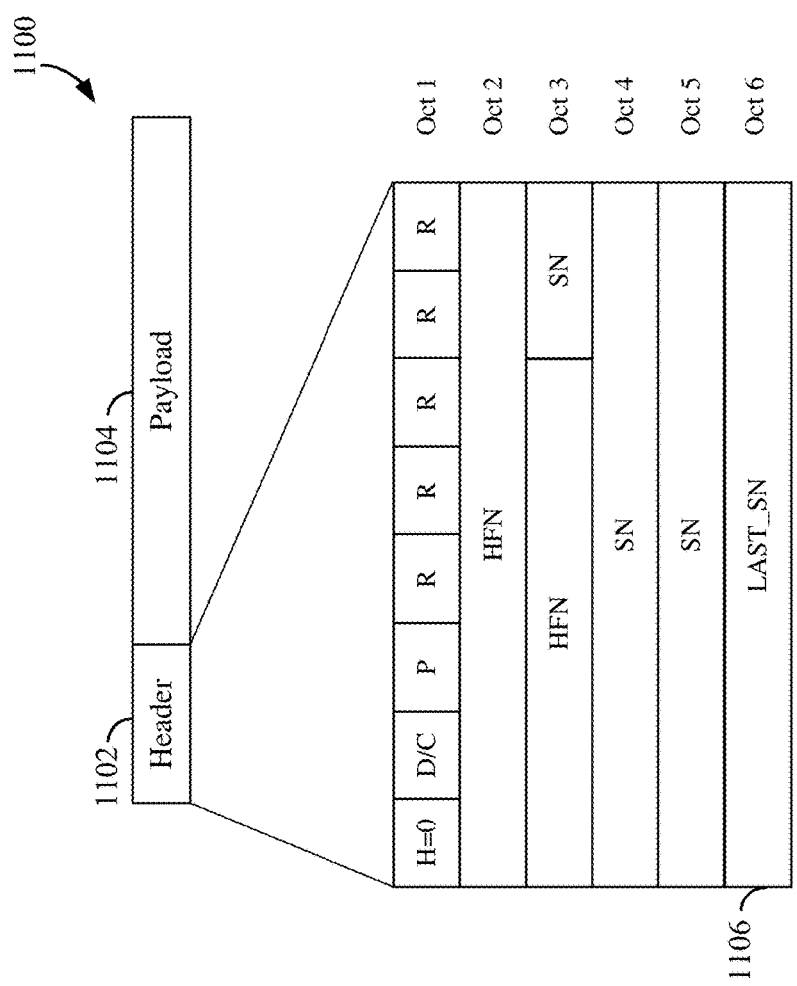
FIG. 11 is a diagram illustrating an example of a packet data convergence protocol (PDCP) packet according to an aspect of the disclosure.

In some aspects of the disclosure, the last packet indicator (e.g., last SN 708) may be transmitted in a PDCP header or a Radio Link Control (RLC) header corresponding to the transmitted packet. FIG. 11 is a diagram illustrating an example of a PDCP packet 1100 in accordance with an aspect of the disclosure. The PDCP packet 1100 has a header 1102 and a payload portion 1104. In this specific example, the PDCP header 1102 has a last_SN field 1106 that may carry the last packet indicator. The PDCP header 1102 may include other fields such as a header type flag (H), a Data/Control bit (D/C), a hyper frame number (HFN), a sequence number (SN), etc. In other examples, other header structures may be used to carry the last packet indicator.

In one aspect of the disclosure, the last packet indicator (e.g., Last_SN 1106) may include the last K bits of the SN of the last packet (previous packet) associated with the same flow. In this example, the number of bits of the last packet indicator may be less than or equal to the number (N) of bits of the last packet's SN (i.e., K≤N). In another aspect of the disclosure, the last packet indicator may include the last K bits of the difference between the last packet's SN and the current packet's SN. In one example, referring to FIG. 7, packet 4 of the first flow may have a last packet indicator that includes the last K bits of the difference between the SN of packet 1 and the SN of packet 4. The value of K may be configured by the network using, for example, an RRC configuration procedure.

Figure 12:
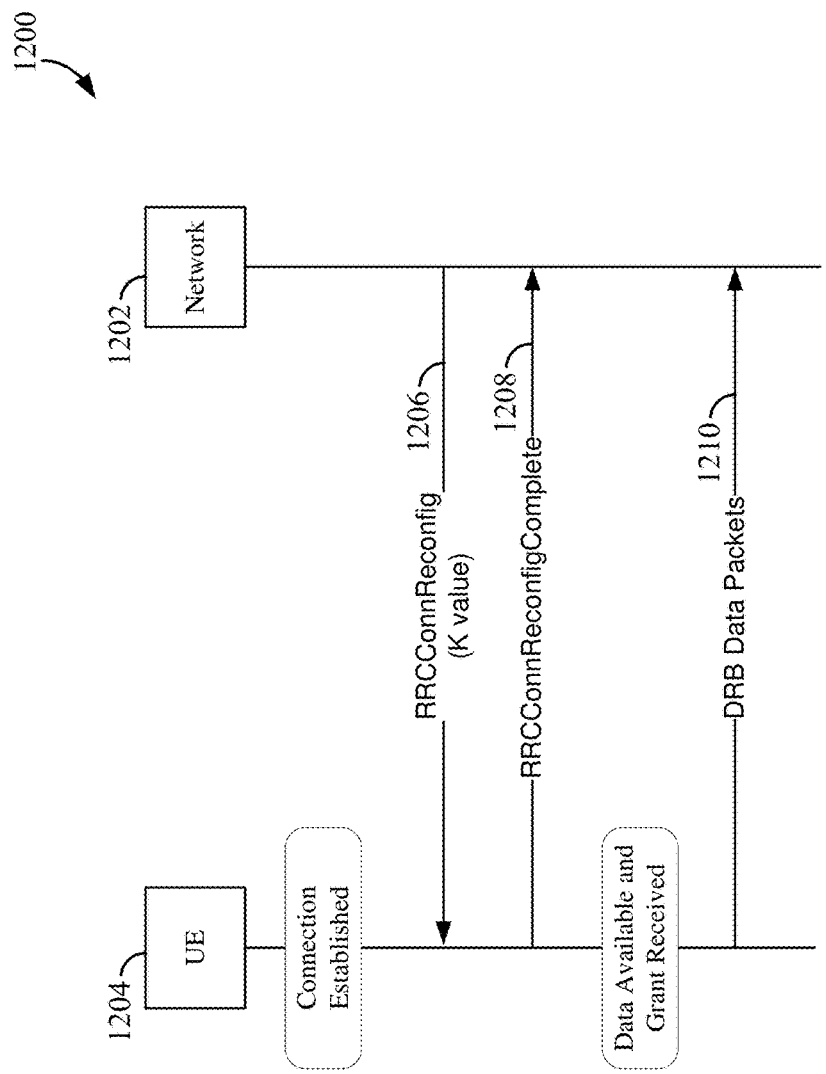
FIG. 12 is a diagram illustrating an example of Radio Resource Control (RRC) configuration procedure for configuring a last packet indicator according to some aspects of the disclosure.

FIG. 12 is a diagram illustrating an example of RRC configuration procedure 1200 for configuring the above-described last packet indicator in accordance with some aspects of the disclosure. For example, a network 1202 may indicate the K value to a UE 1204 in a PDCP configuration information element (IE) that may be carried in an RRC Connection Reconfiguration message 1206. The RRC Connection Reconfiguration message 1206 may be used to modify an RRC connection, for example, establishing/modifying/releasing radio bearers, performing handovers, performing measurements, etc. Then, the UE 1204 may complete the RRC reconfiguration by sending an RRC Connection Reconfiguration Complete message 1208 to the network 1202. After the reconfiguration, the UE 1204 may send DRB data packets 1210 including a K bit last packet indicator. In some examples, the network 1202 may configure the last packet indicator of a packet to explicitly indicate the sequence number of the previously transmitted packet. In other examples, the network 1202 may configure the last packet indicator to provide a value relative from the sequence number of the previously transmitted packet. For example, the relative value may be an offset or delta of the sequence number of the previous packet. In one example, if the sequence number of a packet is 4, and the sequence number of its previous packet is 1, the last packet indicator may have a relative value of 3.

Figure 13:
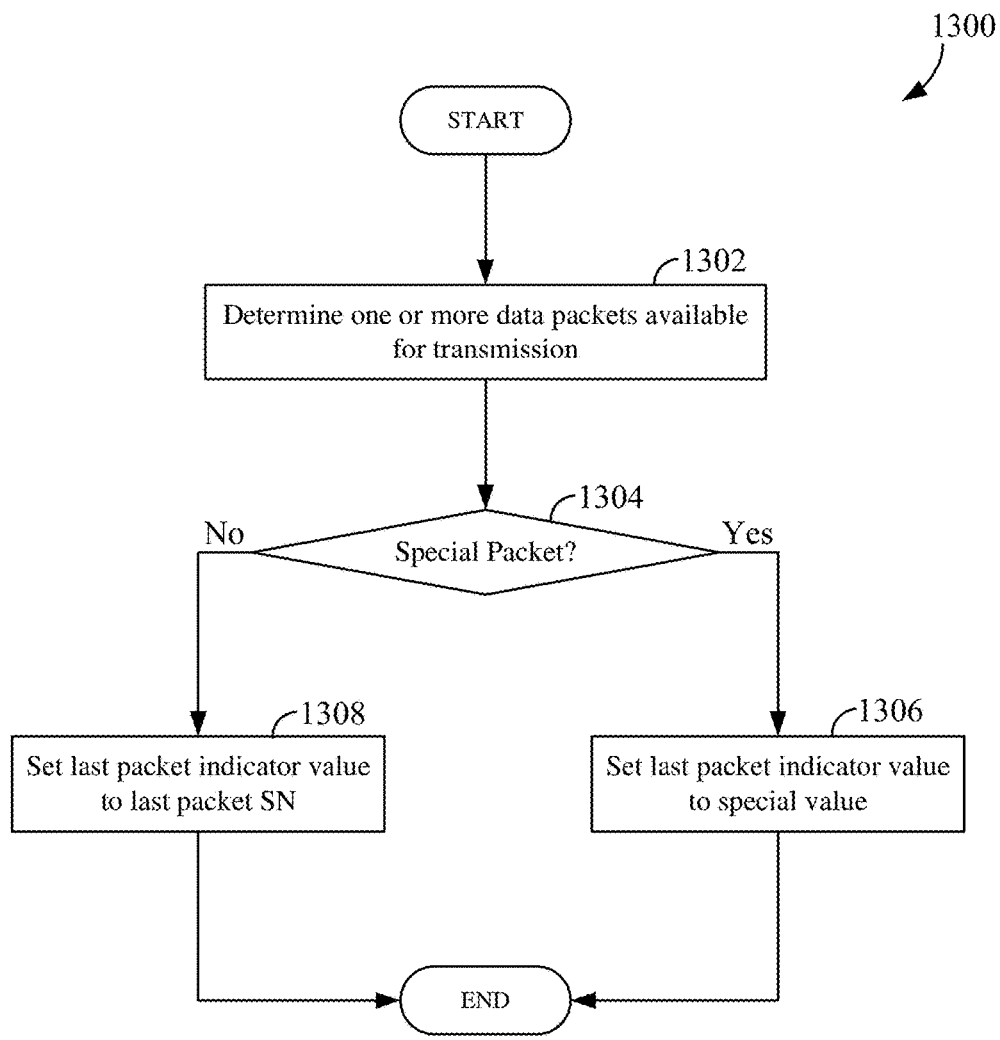
FIG. 13 is a diagram illustrating an exemplary process for determining a value of a last packet indicator according to some aspects of the disclosure.

FIG. 13 is a diagram illustrating an exemplary process for determining a value of a last packet indicator in accordance with some aspects of the disclosure. For example, this process may be performed by any of the scheduled entities and/or scheduling entities illustrated in FIGS. 1-5, 10, and/or 12 or any apparatus to set the value of the last packet indicator (e.g., Last SN 708). At block 1302, an apparatus may utilize a radio bearer communication block 340 or 440 to determine that one or more data packets are available for transmission using a DRB. These data packets may be similar to those described in relation to FIG. 7. At decision block 1304, the apparatus may utilize a packet reordering block 344 or 444 to determine whether any of the data packets is a special packet. If the packet is a special packet, the process continues to block 1306; otherwise, the process continues to block 1308. In one example, a special packet has no previous or last packet. In this case, the special packet may be a first or initial packet of an IP flow. In another example, a special packet may be a retransmitted packet. In another example, a special packet may have a last packet indicator that is set to discard a predetermined packet.

At block 1306, the apparatus may utilize the packet reordering block 340 or 440 to set the last packet indicator of the packet to a special value (e.g., a predetermined value). In one aspect of the disclosure, when the apparatus retransmits a packet, the last packet indicator of the retransmitted packet (special packet) may have a special value indicating that this packet can be delivered without waiting for other packets, or may have the same last SN value as the original packet. In another aspect of the disclosure, the apparatus may decide to discard a predetermined previously transmitted packet. In this example, the apparatus may transmit a packet with a last packet indicator that has the value of the last packet indicator of the packet to be discarded, or a special value (e.g., a predetermined value). For example, referring to FIG. 7, assuming the apparatus has transmitted packet 1 and packet 4 of flow 1, the next packet to be transmitted is packet 7, and the last packet indicator maintained by the apparatus is associated with the SN of packet 4. That is, when the apparatus transmits packet 7, its last packet indicator will indicate packet 4 to be the last packet. However, if the apparatus decided to discard packet 4, the last packet indicator of packet 7 may have the same value of the last packet indicator of packet 4, indicating packet 1 to be the last packet.

At block 1308, the apparatus sets the last packet indicator of the packet to be the SN of the previous or last packet. For example, referring to FIG. 7, assuming the apparatus has transmitted packet 1 and packet 4 of flow 1, when the apparatus transmits packet 7, its last packet indicator will be set to a value that indicates packet 4 to be the last packet. In this case, the packet is not a special packet.

Figure 14:
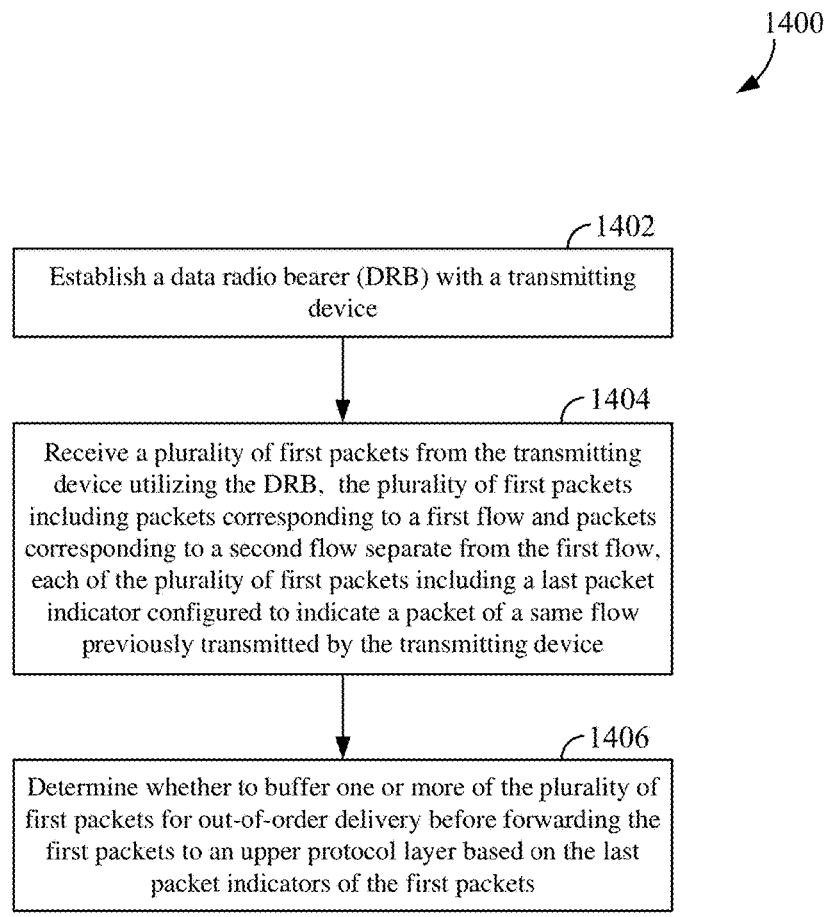
FIG. 14 is a flow chart illustrating a wireless communication method operable at a receiving apparatus utilizing in-band control for DRB flows according to some aspects of the disclosure.

FIG. 14 is a flow chart illustrating a communication method 1400 operable at a receiving apparatus utilizing in-band control for DRB flows in accordance with some aspects of the disclosure. This method may be performed using any of the scheduling entities and scheduled entities illustrated in FIGS. 1-5, 10, and/or 12, or any apparatus. At block 1402, an apparatus may utilize a radio bearer communication block 340 or 440 to establish a DRB with a transmitting device. The DRB may be established using an RRC connection setup procedure described above in relation to FIG. 10.

At block 1404, the apparatus may utilize the radio bearer communication block 340 or 440 to receive a plurality of first packets from the transmitting device utilizing the DRB. The plurality of first packets include packets corresponding to a first flow and packets corresponding to a second flow separate from the first flow. Each of the plurality of first packets includes a last packet indicator configured to indicate a packet of a same flow previously transmitted by the transmitting device. The last packet indicator may indicate a sequence number (SN) of a previously transmitted packet (last packet) of the same flow as described above in relation to FIG. 7. In some examples, the last packet indicator may be transmitted as part of a PDCP or RLC header corresponding to the transmitted packet. In one example, the flows may be the flows (flow 1, flow 2, and flow 3) as described above in relation to FIG. 7.

At block 1406, the apparatus may utilize the packet reordering block 344 or 444 to determine whether to buffer one or more of the plurality of first packets for out-of-order delivery before forwarding the first packets to an upper protocol layer (e.g., layer 3 entity) based on the last packet indicators of the first packets. Out-of-order delivery of packets refers to the delivery of packets in an order different from the order that the packets are received. In one example, the first packets include the packets of three different flows (e.g., flows 1, 2, and 3 as illustrated in FIG. 7). The apparatus may utilize the process described in relation to FIG. 14 below to change the order of delivery of the packets.

Figure 15:
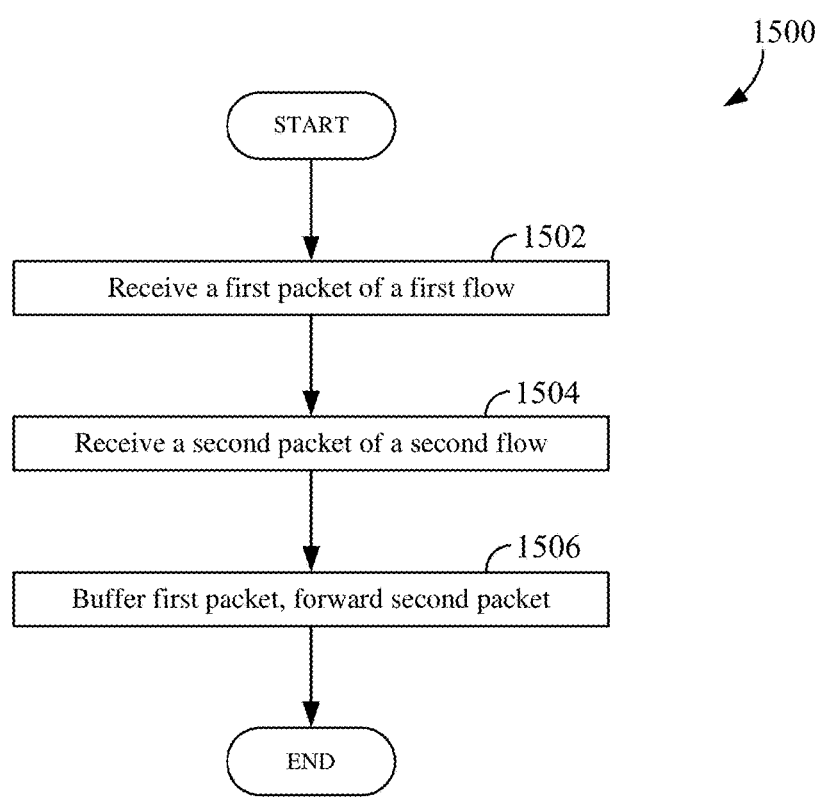
FIG. 15 is a diagram illustrating a packet reordering process according to some aspects of the disclosure.

FIG. 15 is a diagram illustrating a packet reordering process 1500 in accordance with some aspects of the disclosure. This packet reordering process may be performed using any of the scheduling entities and scheduled entities illustrated in FIGS. 1-5, 10 and/or 12, or any apparatus. In one example, the packet reordering process 1500 may be performed at block 1406 of FIG. 14 to facilitate out-of-order delivery of packets.

At block 1502, an apparatus may receive a first packet of a first flow. For example, the first packet may be packet 4 of flow 1 illustrated in FIG. 7. At block 1504, the apparatus may receive a second packet of a second flow. For example, the second packet may be packet 6 of flow 3 illustrated in FIG. 7. In this example, it is assumed that the last packet (e.g., packet 1) of the first packet (packet 4) has not been received, but the last packet (e.g., packet 3) of the second packet (packet 6) has been received. Therefore, the apparatus may reorder the delivery of the first packet and second packet. That is, the apparatus may buffer the first packet to wait for its missing last packet, while the second packet can be forwarded out-of-order to the upper protocol layer. Therefore, the packets delivered to the upper protocol layer are reordered and different from the order they are received (i.e., out-of-order delivery).

In one aspect of the disclosure, the apparatus may buffer multiple packets (e.g., packets 4, 5, 7, 8, 10, and 11 of FIG. 7) in a packet buffer 346 or 446 to wait for the missing packets (e.g., packets 1 and 2), while forwarding the already received packets (e.g., packets of flow 3 of FIG. 7) out-of-order without unnecessary delay due to the missing packets. In one aspect of the disclosure, the receiving device or apparatus does not forward a received packet to the upper protocol layer if a packet identified by the last packet indicator of the received packet is buffered for reordering or has not been received. A packet may be buffered for reordering for various reasons as described above including when a packet identified by the buffered packet's last packet indicator has not been received.

In one aspect of the disclosure, the receiving device or apparatus may forward or deliver a received packet to the upper protocol layer if the packet identified by the last packet indicator of the received packet has been delivered. In one aspect of the disclosure, the receiving device or apparatus may forward or deliver a received packet to the upper protocol layer without buffering or reordering if the last packet indicator of the packet has a special value (e.g., a predetermined value) that indicates that no buffering for reordering is needed for this packet.

In one aspect of the disclosure, the receiving device or apparatus may receive an RRC message, a PDCP control PDU, an RLC control PDU, or a media access control (MAC) control element that indicates the value of K as described above. The value of K may be the number of bits used for the last packet indicator.

In one configuration, the apparatus 300 or 400 for wireless communication includes means for performing the processes and procedures described above in relation to FIGS. 7-15. In one aspect, the aforementioned means may be the processor(s) 304 in which the invention resides from FIG. 3 configured to perform the functions recited by the aforementioned means. In another aspect, the aforementioned means may be a circuit or any apparatus configured to perform the functions recited by the aforementioned means.

Of course, in the above examples, the circuitry included in the apparatus 300 or 400 is merely provided as an example, and other means for carrying out the described functions may be included within various aspects of the present disclosure, including but not limited to the instructions stored in the computer-readable storage medium 306 or 406, or any other suitable apparatus or means described in any one of the FIGS. 1-5, 10, and/or 12, and utilizing, for example, the processes and/or algorithms described herein in relation to FIGS. 7-15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of communication operable at a transmitting apparatus, comprising:
   establishing a data radio bearer (DRB) with a receiving device; and
   transmitting a plurality of first packets to the receiving device utilizing the DRB, the plurality of first packets comprising a plurality of packets corresponding to a first flow and a plurality of packets corresponding to a second flow separate from the first flow,
   a packet of the plurality of first packets comprising a sequence number and a last packet indicator, the last packet indicator configurable to a first value indicating no buffering of the packet and a second value indicating a previously transmitted packet of a same flow of the packet to reduce head-of-line blocking at the receiving device between the first flow and the second flow due to missing packets.

2. The method of claim 1, wherein the second value comprises:
   a sequence number of the previously transmitted packet; or
   a value derived from the sequence number of the previously transmitted packet.

3. The method of claim 1, wherein the transmitting comprises transmitting the last packet indicator in a header of the packet.

4. The method of claim 1, wherein the transmitting comprises transmitting the last packet indicator as a plurality of bits derived from a sequence number of the previously transmitted packet of the same flow.

5. The method of claim 1, wherein:
   the last packet indicator comprises K bits of a sequence number of the previously transmitted packet of the same flow, wherein a value of K is less than or equal to a number of bits of the sequence number of the previously transmitted packet; or
   the last packet indicator comprises K bits of a difference between the previously transmitted packet and the packet of the same flow, wherein a value of K is less than or equal to a number of bits of the sequence number of the previously transmitted packet.

6. The method of claim 5, further comprising receiving at least one of:
   a radio resource control (RRC) message comprising the value of K;
   a packet data convergence protocol (PDCP) protocol data unit (PDU) comprising the value of K;
   a radio link control (RLC) control PDU comprising the value of K; or
   a media access control (MAC) control element comprising the value of K.

7. The method of claim 1,
   wherein the first value is configured to indicate that the packet has no previously transmitted packet corresponding to the same flow.

8. The method of claim 7,
   wherein the second value is configured to request the receiving device not to forward the packet to an upper protocol layer before receiving a packet identified by the last packet indicator of the packet.

9. A method of communication operable at a receiving apparatus, comprising:

establishing a data radio bearer (DRB) with a transmitting device;

receiving a plurality of first packets in a first order from the transmitting device utilizing the DRB, the plurality of first packets comprising a plurality of packets corresponding to a first flow and a plurality of packets corresponding to a second flow separate from the first flow, each of the plurality of first packets comprising a sequence number and a last packet indicator, the last packet configurable to a first value indicating no buffering of the packet and a second value indicating a previously transmitted packet of a same flow; and determining whether to deliver the plurality of first packets to an upper protocol layer in a second order different from the first order based on the last packet indicators of the first packets to reduce head-of-line blocking between the first flow and the second flow due to missing packets.

10. The method of claim 9, wherein the receiving comprises receiving the last packet indicator in a header of the first packet.

11. The method of claim 9, wherein the receiving comprises receiving the last packet indicator as a plurality of bits derived from a sequence number of the previously transmitted packet of the same flow.

12. The method of claim 9, wherein:

the last packet indicator comprises K bits of a sequence number of the previously transmitted packet, wherein a value of K is less than or equal to a number of bits of the sequence number of the previously transmitted packet; or the last packet indicator comprises K bits of a difference between the previously transmitted packet and the first packet, wherein a value of K is less than or equal to a number of bits of the sequence number of the previously transmitted packet.

13. The method of claim 12, further comprising transmitting at least one of:

a radio resource control (RRC) message comprising the value of K;

a packet data convergence protocol (PDCP) protocol data unit (PDU) comprising the value of K;

a radio link control (RLC) control PDU comprising the value of K; or a media access control (MAC) control element comprising the value of K.

14. The method of claim 9, further comprising at least one of:

buffering a first packet of the plurality of first packets if a packet identified by the last packet indicator of the first packet is not received;

buffering a first packet of the plurality of first packets if a packet identified by the last packet indicator of the first packet is buffered for reordering;

forwarding a first packet of the plurality of first packets without buffering for reordering if a packet identified by the last packet indicator of the first packet has been delivered to the upper protocol layer; or forwarding a first packet of the plurality of first packets without buffering for reordering if the last packet indicator indicates no reordering.

15. An apparatus for wireless communication, comprising:

a communication interface configured to communicate with a receiving device;

a memory stored with executable code; and a processor operatively coupled to the communication interface and memory, wherein the processor is configured by the executable code to:

establish a data radio bearer (DRB) with the receiving device; and transmit a plurality of first packets to the receiving device utilizing the DRB, the plurality of first packets comprising a plurality of packets corresponding to a first flow and a plurality of packets corresponding to a second flow separate from the first flow, a packet of the plurality of first packets comprising a sequence number and a last packet indicator, the last packet indicator configurable to a first value indicating no buffering of the packet and a second value indicating a previously transmitted packet of a same flow of the packet to reduce head-of-line blocking at the receiving device between the first flow and the second flow due to missing packets.

16. The apparatus of claim 15, wherein the second value comprises:

a sequence number of the previously transmitted packet; or a value derived from the sequence number of the previously transmitted packet.

17. The apparatus of claim 15, wherein the processor is further configured to transmit the last packet indicator in a header of the packet.

18. The apparatus of claim 15, wherein the processor is further configured to transmit the last packet indicator as a plurality of bits derived from a sequence number of the previously transmitted packet of the same flow.

19. The apparatus of claim 15, wherein:

the last packet indicator comprises K bits of a sequence number of the previously transmitted packet of the same flow, wherein a value of K is less than or equal to a number of bits of the sequence number of the previously transmitted packet; or the last packet indicator comprises K bits of a difference between the previously transmitted packet and the packet of the same flow, wherein a value of K is less than or equal to a number of bits of the sequence number of the previously transmitted packet.

20. The apparatus of claim 19, wherein the processor is further configured to receive at least one of:

a radio resource control (RRC) message comprising the value of K;

a packet data convergence protocol (PDCP) protocol data unit (PDU) comprising the value of K;

a radio link control (RLC) control PDU comprising the value of K; or a media access control (MAC) control element comprising the value of K.

21. The apparatus of claim 15, wherein the first value is configured to indicate that the packet has no previously transmitted packet corresponding to the same flow.

22. The apparatus of claim 21, wherein the second value is configured to request the receiving device not to forward the packet to an upper protocol layer before receiving a packet identified by the last packet indicator of the packet.

23. An apparatus for wireless communication, comprising:

a communication interface configured to communicate with a transmitting device;

a memory stored with executable code; and a processor operatively coupled to the communication interface and memory, wherein the processor is configured by the executable code to:

establish a data radio bearer (DRB) with the transmitting device;

receive a plurality of first packets in a first order from the transmitting device utilizing the DRB, the plurality of first packets comprising a plurality of packets corresponding to a first flow and a plurality of packets corresponding to a second flow separate from the first flow, each of the plurality of first packets comprising a sequence number and a last packet indicator, the last packet indicator configurable to a first value indicating no buffering of the first packet and a second value indicating a previously transmitted packet of a same flow; and determine whether to deliver the plurality of first packets to an upper protocol layer in a second order different from the first order based on the last packet indicators of the first packets to reduce head-of-line blocking between the first flow and the second flow due to missing packets.

24. The apparatus of claim 23, wherein the processor is further configured to receive the last packet indicator in a header of the first packet.

25. The apparatus of claim 23, wherein the processor is further configured to receive the last packet indicator as a plurality of bits derived from a sequence number of the previously transmitted packet of the same flow.

26. The apparatus of claim 23, wherein:

the last packet indicator comprises K bits of a sequence number of the previously transmitted packet, wherein a value of K is less than or equal to a number of bits of the sequence number of the previously transmitted packet; or the last packet indicator comprises K bits of a difference between the previously transmitted packet and the first packet, wherein a value of K is less than or equal to a number of bits of the sequence number of the previously transmitted packet.

27. The apparatus of claim 26, wherein the processor is further configured to transmit at least one of:

a radio resource control (RRC) message comprising the value of K;

a packet data convergence protocol (PDCP) protocol data unit (PDU) comprising the value of K;

a radio link control (RLC) control PDU comprising the value of K; or a media access control (MAC) control element comprising the value of K.

28. The apparatus of claim 23, wherein the processor is further configured to at least one of:

buffer a first packet of the plurality of first packets if a packet identified by the last packet indicator of the first packet is not received;

buffer a first packet of the plurality of first packets if a packet identified by the last packet indicator of the first packet is buffered for reordering;

forward a first packet of the plurality of first packets without buffering for reordering if a packet identified by the last packet indicator of the first packet has been delivered to the upper protocol layer; or forward a first packet of the plurality of first packets without buffering for reordering if the last packet indicator indicates no reordering.

\* \* \* \* \*